US008223476B2

United States Patent
Zhang et al.

(10) Patent No.: US 8,223,476 B2
(45) Date of Patent: Jul. 17, 2012

(54) FIELD REPHASEABLE MODULAR METERING DEVICES

(75) Inventors: Fan Zhang, Suwanee, GA (US); Brian J. Rusch, Suwanee, GA (US); Arthur Kevin Shumate, Duluth, GA (US); James R. Tirrell, Palmyra, VA (US); Carey D. Harnois, Grayson, GA (US); Robert E. Henry, Jr., Suwanee, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 263 days.

(21) Appl. No.: 12/371,678

(22) Filed: Feb. 16, 2009

(65) Prior Publication Data

US 2009/0251852 A1    Oct. 8, 2009

Related U.S. Application Data

(60) Provisional application No. 61/030,333, filed on Feb. 21, 2008.

(51) Int. Cl.
*H02B 1/00* (2006.01)
(52) U.S. Cl. ........ 361/671; 361/637; 361/652; 361/665; 200/51.12; 439/517; 439/527; 174/54
(58) Field of Classification Search ................. 361/622, 361/641, 652, 659, 660, 664, 668
See application file for complete search history.

(56) References Cited

U.S. PATENT DOCUMENTS

| 2,349,645 | A | * | 5/1944 | Young ............................ 361/660 |
| 3,290,460 | A | * | 12/1966 | Christensen et al. ....... 200/51.11 |
| 3,628,097 | A | * | 12/1971 | Kobryner ....................... 361/660 |
| 3,707,653 | A | * | 12/1972 | Coffey et al. ................... 361/622 |
| 3,955,123 | A | * | 5/1976 | Goodridge ..................... 361/660 |
| 4,413,306 | A | | 11/1983 | Erickson |
| 5,936,834 | A | * | 8/1999 | Polston et al. ................. 361/664 |
| 6,046,904 | A | | 4/2000 | Kubat |
| 6,421,229 | B1 | * | 7/2002 | Campbell et al. .............. 361/622 |
| 7,652,871 | B2 | * | 1/2010 | Caggiano et al. ............. 361/652 |

* cited by examiner

*Primary Examiner* — Courtney Smith

(57) ABSTRACT

A field rephaseable metering device is provided including at least three distribution buses including two side buses and a center bus, the center bus having a vertical center line. At least one meter socket is provided having a vertical center line offset from the vertical center line of said center bus, each meter socket including a first line terminal and a second line terminal. At least two line straps are provided, each having a first end configured for connecting with one of the first or second line terminals, and a second elongate end configured to be selectively connectable to one of the side buses associated with its line terminal or the center bus. When each line strap is positioned to connect one of the line terminals with one of the distribution buses, a longitudinal axis of each line strap is substantially perpendicular to a longitudinal axis of each distribution bus.

19 Claims, 7 Drawing Sheets

FIELD REPHASEABLE MODULAR METERING DEVICES

CROSS-REFERENCE TO RELATED APPLICATIONS

This application claims the benefit of U.S. Provisional Application Ser. No. 61/030,333, filed Feb. 21, 2008, which is incorporated herein by reference in its entirety.

BACKGROUND

1. Technical Field

This disclosure relates to modular metering devices, and more particularly, to a group metering device with individually field rephaseable meter sockets to selectively balance tenant loads on at least three phases.

2. Description of the Related Art

Utility companies transfer electrical power in three phases (A, B, and C phase) of alternating current (AC) power which are synchronized and offset from each other by 120 degrees. The three phase power is transferred over three wire lines, in addition to a ground or neutral wire, to transformers, which converts the power to lower distribution voltages. A main service panel then distributes single phase electrical power (AB, BC, or AC) to each tenant or customer.

The voltage between the two phases of each single phase of electrical power is typically 240 volts of alternating current (VAC) in the United States, and the voltage between each phase to neutral is 120 VAC. 120 VAC electrical power provides electricity for such uses as lighting, while 240 VAC electrical power is adaptable for major indoor appliances, such as air conditioners, water heaters, stoves and ovens, etc., as well as for outdoor power uses such as motors for swimming pools, jet tubs, fountains, etc. All currents are returned to the electrical circuit after tenant consumption through neutrals.

In most circumstances, neutrals are jointed together and grounded at the customer main service panel or at the transformer. Therefore, it is important that the tenant loads be balanced to use electricity efficiently as well as to prevent overload to any electrical phase that may cause overheating of conductors.

In high-rise buildings, apartments, and some office complexes, utility companies may provide three phase electrical power through bus ways or cables to a service entrance which is connected to modular meter stacks (group metering) to distribute three phase electrical power to single phase meter sockets, and ultimately to the tenant. Due to the similarity of any individual unit, each unit typically requires almost same tenant load for each meter position/tenant. Therefore, by having an equal number of meter positions/tenants on each of the single phase combinations (AB, BC, or AC) the total load can be balanced over all three phases.

Starting in 1970's, meter socket stacks offered 2 to 6 meter position devices with three phase through buses but single phase interior riser bus. Such meter stack devices could not be rephased after factory installation. Contractors had to predetermine a calculated tenant load and then buy pre-phased different meter position meter stacks to achieve an equal number of meter positions on any single phase. This required a very complex calculation and ordering process in order to achieve a balanced phase combination, including taking into consideration such issues as the number of meter positions required, each phase tenant load, the existing product selection, and lead time.

In the late 1990's, field phase changeable meter stacks were invented that allowed reconnection of single phase riser buses to different phases after factory installation. This was quite advantageous compared to the earlier non-rephaseable meter stack devices. For example, if four meter position units were needed, contractors had to order each of separate pre-phased AB, BC, and AC units in the non-rephaseable version. With the field rephaseable device, contractors only needed to order three same units and convert them to AB, EC, and AC phasing as needed in the field.

U.S. Pat. No. 5,936,834 to Polston et al. (hereinafter Polston) discloses a meter stack wherein each single phase meter base in the meter stack can be selectively connected in the field to any one of the three phase combinations by moving meter base line connectors. The meter stack allowed contractors to change the phase combination on any individual meter socket. Polston's device addressed situations wherein the number of tenants was not a multiple of three or where significant changes were needed for rebalancing the tenant load after calibrating the circuit. It was desirable to alter a few meter sockets to different phases on the job site.

Accordingly, an efficient and effective device and method for enabling field rephrasing of individual meter sockets in a modular metering device, is highly desirable.

SUMMARY OF THE INVENTION

According to an aspect of the present principles, a modular metering device is provided wherein any individual meter socket can be rephased between A-B, B-C, or A-C phase combinations in the field by moving only the line straps attached to the meter sockets.

According to another aspect, line straps are provided for modular meter sockets configured to be easily connectable to another phase bus, while maximizing electrical contact between the meter sockets and phase bus.

A modular metering device is provided having field-rephaseable individual meter sockets, in which three phase (A, B and C phase) alternating current riser buses are parallel installed and a single phase meter socket can be selectively connected to any two phases in factory or in the field to achieve any of the AB, BC or AC phase combinations. At least three phase riser buses are laid in a same datum plan parallel to the meter sockets. The center phase riser bus is at the center of two side phase riser buses, and includes a centerline which is offset to a centerline of the meter sockets. Each meter socket has two line terminals for receiving electricity for the single phase meter socket. Each line terminal on a meter socket is mounted in the middle above two of the riser buses.

A line strap is provided attached to a line terminal on a meter socket at one end and configured to be reattachable from one bus to the other for selective connection to different phases to achieve different phase combinations. Two line straps and three phase riser buses can achieve any phase combination (AB, BC, AC, for any individual meter socket. Advantageously, a device according to the present principles enables the phase combination of a meter socket to be altered in the field to achieve a balanced tenant load for all three phases at a job site in an efficient and effective manner, while maximizing the surface area of electrical contact between the buses and line terminals.

According to one aspect of the present principles, a field rephaseable modular metering device is provided including a meter section comprising at least three vertical distribution buses comprising two side buses and a center bus each disposed equidistant from each other, the center bus having a vertical center line; at least one meter socket including a first line terminal and a second line terminal. At least two line straps are provided, each having a first end configured for connecting with one of the first or second line terminals, and a second elongate end configured to be selectively connectable to one of the side buses associated with its line terminal or the center bus, wherein when each line strap is positioned to connect one of the line terminals with one of the distribution buses, a longitudinal axis of each line strap is substantially perpendicular to a longitudinal axis of each distribution bus.

According to another aspect, a field rephaseable modular metering device is provided including a meter section comprising at least three vertical distribution buses comprising two side buses and a center bus each disposed equidistant from each other, the center bus having a vertical center line. At least one meter socket is provided having a vertical center line offset from the vertical center line of said center bus, each meter socket including a first line terminal and a second line terminal. At least two line straps are provided, each having a first end configured for connecting with one of the first or second line terminals, and a second elongate end configured to be selectively connectable to one of the side buses associated with its line terminal or the center bus.

According to yet another aspect, a field rephaseable modular metering device is provided including a meter section comprising at least three vertical distribution buses comprising two side buses and a center bus each disposed equidistant from each other, the center bus having a vertical center line. At least one meter socket is provided having a vertical center line offset from the vertical center line of said center bus, each meter socket including a first line terminal and a second line terminal. At least two line straps are provided, each having a first end configured for connecting with one of the first or second line terminals, and a second elongate end configured to be selectively connectable to one of the side buses associated with its line terminal or the center bus, wherein when each line strap is positioned to connect one of the line terminals with one of the distribution buses, a longitudinal axis of each line strap is substantially perpendicular to a longitudinal axis of each distribution bus.

These and other objects, features and advantages of the present invention will become apparent from the following detailed description of illustrative embodiments thereof, which is to be read in connection with the accompanying drawings.

BRIEF DESCRIPTION OF THE DRAWINGS

This disclosure will present in detail the following description of preferred embodiments with reference to the following figures wherein.

DETAILED DESCRIPTION OF PREFERRED EMBODIMENTS

The present invention will be described in terms of illustrative embodiments. It should be understood that the present invention is not limited to the details and description shown in these illustrative non-limiting examples and may be employed or practiced in various other ways. Further, the specific terminology used herein is for purposes of description and is not intended to be limiting in any way.

Thus, for example, it will be appreciated by those skilled in the art that the diagrams presented herein represent conceptual views of illustrative system components and/or mechanics embodying the principles of the invention.

Figure 1:
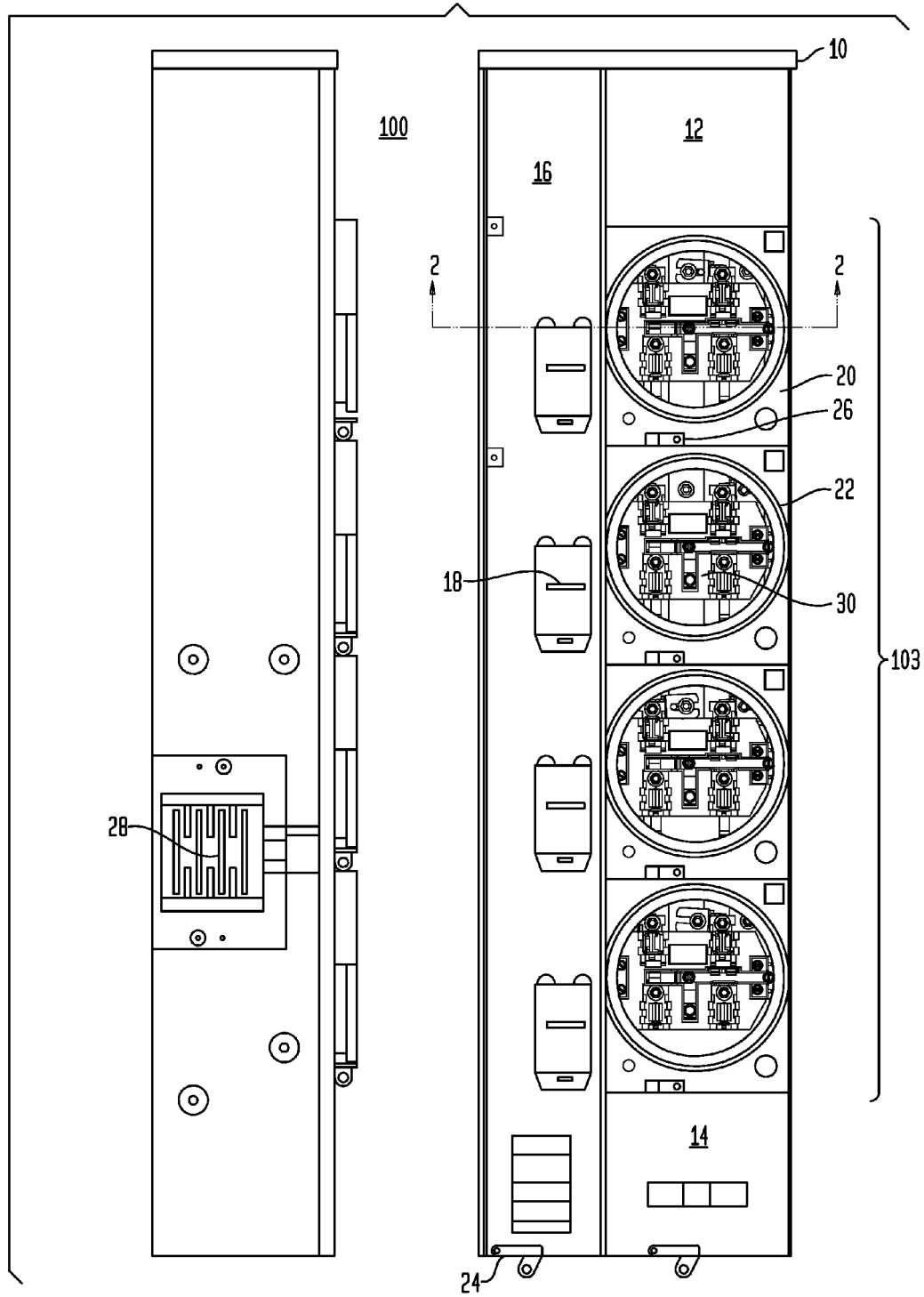
FIG. 1 depicts side and front views of an exemplary four meter position modular metering device according to an aspect of the present principles.

Referring now in specific detail to the drawings in which like reference numerals identify similar or identical elements throughout the several views, and initially to FIG. 1, side and front views of an exemplary four meter position modular metering device 100 according to an aspect of the present principles are shown. The four meter position modular metering device 100 includes an enclosure 10, an upper tenant cover 12, a lower tenant cover 14, a load tenant cover 16, a breaker cover 18, a meter cover 20 and enclosed electrical connections. The tenant covers 12/14/16 are latched onto the enclosure 10 via fasteners 24. Beneath the tenant covers 12/14/16 and inside the enclosure 10, load wireways/load section 602 and breaker basepans 34 (shown in FIG. 2) are provided for load tenant connections.

All meter covers 20 are configured to be individually removable or installable, and are sealed (e.g., via a latch 26 for a ringless type meter cover, or via a sealing ring for a ring-type meter cover). Each meter cover 20 has a meter opening 22 configured to receive a watt-hour meter. Meter sockets 30, with line and load connections, are laid under the meter openings 22 for plugging-in watt-hour meters. Line electrical power is fed to the modular metering device through cross feeder buses 28.

Figure 2:
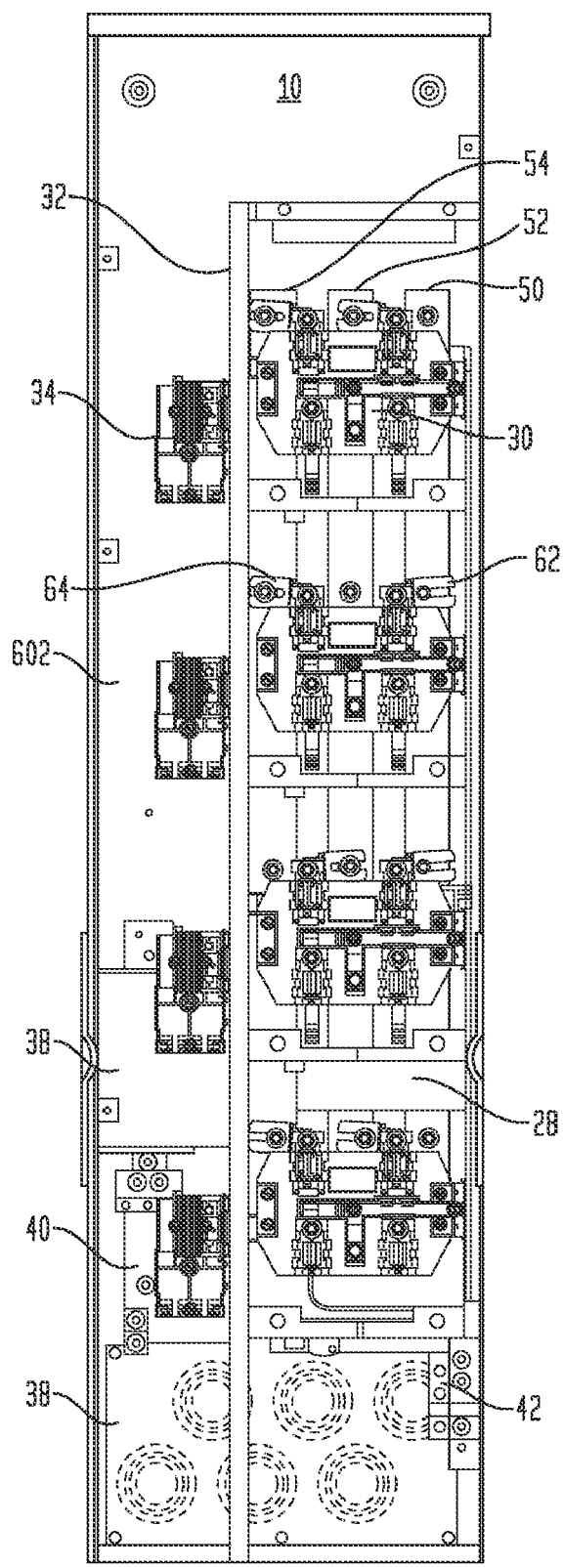
FIG. 2 depicts a front view of exemplary internal components of the four meter position modular metering device of FIG. 1 with covers removed according to an aspect of the present principles.
Figure 6:
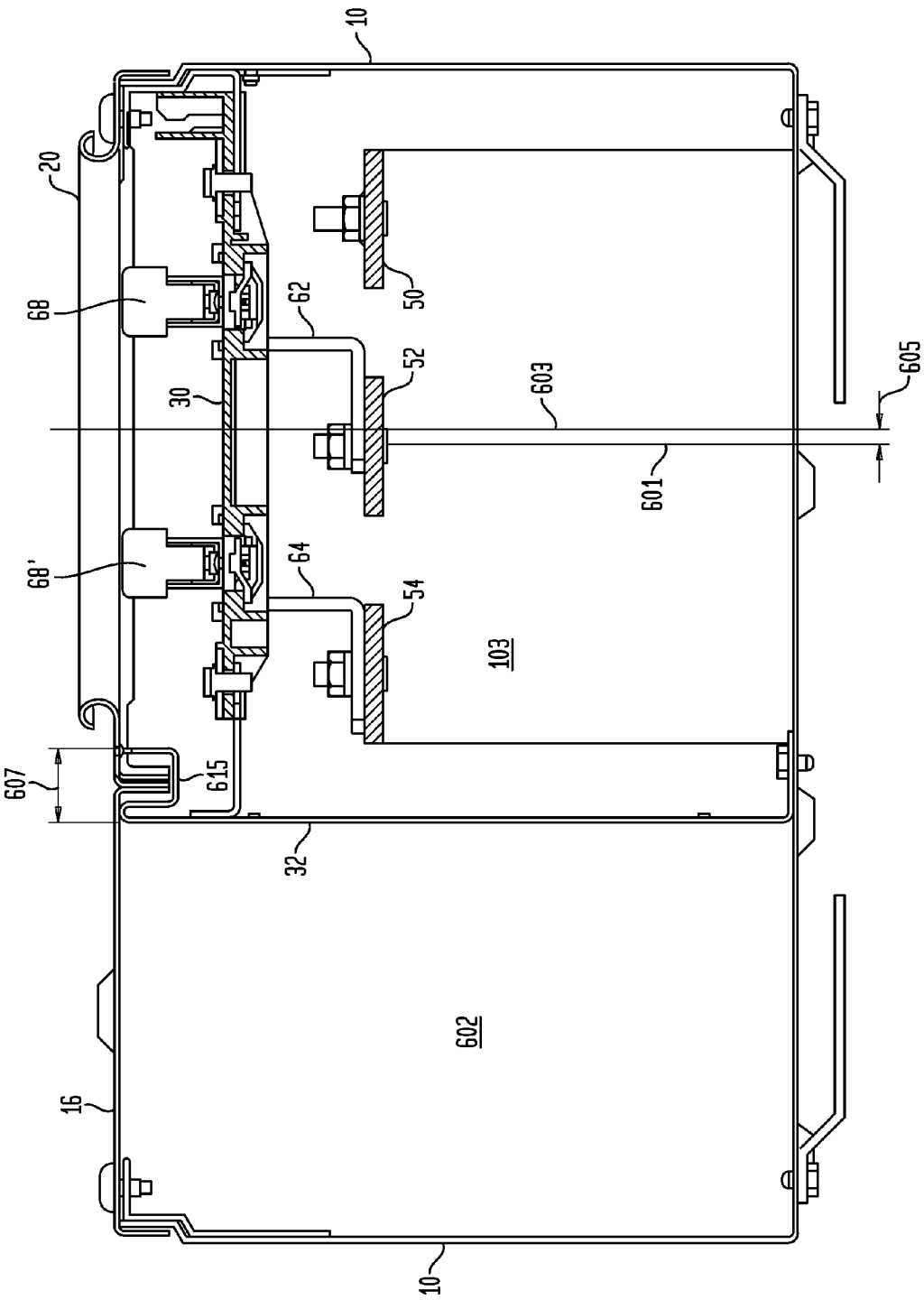
FIG. 6 is a cross-sectional view taken along line A-A of the top meter socket in FIG. 1, showing an exemplary layout of meter sockets with respect to phase buses according to an aspect of the present principles.

FIG. 2 will now be discussed with reference with FIG. 6. FIG. 2 depicts a front view of exemplary internal components of the four meter position modular metering device of FIG. 1 with covers removed according to an aspect of the present principles. FIG. 6 is a cross-sectional view taken along line A-A of FIG. 1 (which comprises the centerline of the top meter socket of FIG. 1) showing an exemplary layout of meter sockets with respect to phase buses according to an aspect of the present principles. A barrier 32 divides the enclosure 10 into two separate sections: a utility section (meter section 103) and a load tenant section 602 (encompassing the area beneath tenant covers 12, 14, 16. In particular, the barrier 32 divides the meter section 103 from a tenant/breaker section 602 (area which includes breakers 34, shown in FIG. 6). The barrier 32 preferably includes a rain channel 615 (shown in FIG. 6) which may e.g., be integrated with the barrier, and is provided in the meter section. The rain channel 615 is provided beneath a junction of the breaker cover 16 and meter cover 20 to provide a rain-proof seal thereat.

Advantageously, a rain channel arrangement according to the present invention efficiently utilizes the available space in the meter section 103 (beneath the rain channel 615) and provides maximum wiring space in the load tenant section 602. This rain channel arrangement provides more space for the at least three riser distribution buses 50/52/54 under the rain channel than for the meter sockets 30 that are at the same level of the rain channel. Therefore, according to one aspect of the present invention, the center line 603 of each meter socket 30 is offset with respect to the center line 601 of each riser distribution bus 50/52/54. According to one embodiment, the offset 605 between the center lines 601, 603 may comprise e.g., at least about ⁵⁄₃₂" in instances where a rain channel 615 having a width 607 of about ¾" is provided in the meter section 103.

Moreover, the positioning of the rain channel in the meter section facilitates breaker installation and helps to ensure sturdy and firm support for the breaker mounting. As shown on FIG. 6, the at least three phase buses 50, 52 and 54 are enabled to be spread within the full width between the barrier 32 and enclosure wall 10. But, as explained above, the meter sockets 30 are shifted about ⁵⁄₃₂" due to the ¾" wide rain channel narrowing the space for meter sockets 30. While the meter sockets still have sufficient space, the placement of the rain channel within the meter section 103 made it possible to reduce the enclosure width by ¾", which is a beneficial space-saving feature which helps maximize the number of meter enclosures which may be fit within the wall surface area limits of an electrical room.

Once the meter covers and watt-hour meters are installed and sealed, the meter (utility) section 103 is protected from customer access. The load tenant section 602 is accessible to customers for maintenance on wiring and for operating circuit protection instruments. Electrical power is fed to the modular metering device through the cross feeder buses 28 to the riser distribution buses 50/52/54 and then through the line straps 62/64 to meter sockets 30. The load terminals 48/48' (shown in FIG. 3) are connected to load basepans 34 in the load tenant section 602. The cross feeder buses 28 are protected by a bus cover 36 while they pass through the load tenant section 602. Neutral 40 and equipment ground terminals 42 are provided in the load tenant section 602.

Figure 3:
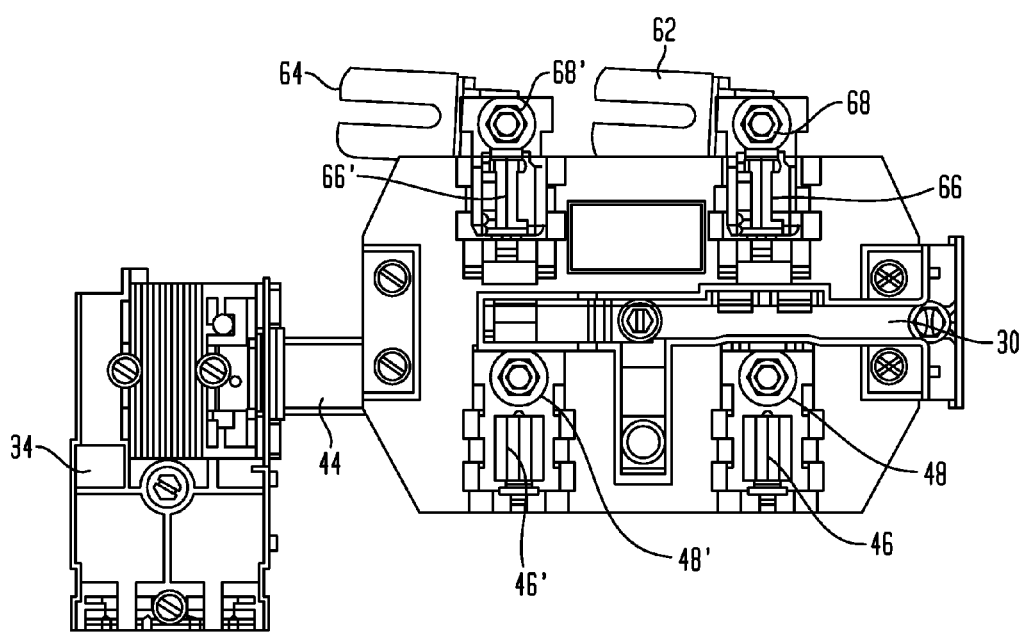
FIG. 3 is a front view of an exemplary single meter position module showing attached line straps according to an aspect of the present principles.

FIG. 3 is a front view of the connections of an exemplary single meter position module including a meter socket 30, line straps 62/64, and basepan assembly 34. According to one embodiment, there are four meter jaws: two line jaws 66/66' and two load jaws 46/46', in the meter socket 30. The line straps 62/64 which are attached to the line jaws 46/46' on the line terminals are configured to be connected to riser distribution buses 50 and/or 52 and/or 54 to transfer electrical power to the meter socket 30. The load terminals 48/48' on the load meter Laws 46/46' are connected to the load basepan 34 through the load straps 44, through which electrical power is distributed to the tenant load. Each line terminal 68/68' may be connected to the center bus 52 of its associated respective side bus (e.g., as shown in the exemplary FIG. 5, line terminal 68 would be associated with side bus 50, and line terminal 68' would be associated with side bus 54).

Figure 4:
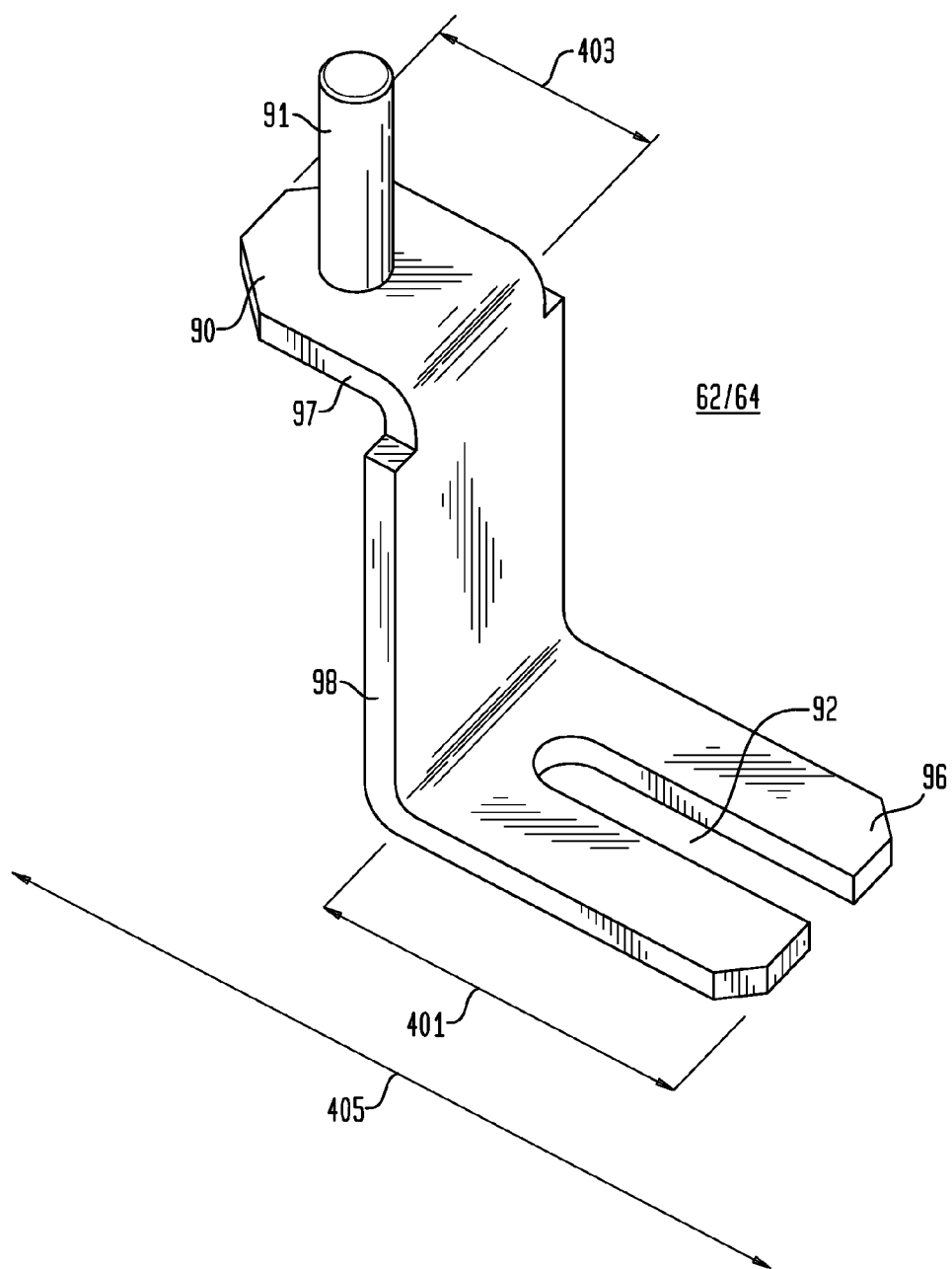
FIG. 4 is a front perspective view of an exemplary line strap having an attached stud member according to an aspect of the present principles.

FIG. 4 is a front perspective view of an exemplary line strap 62/64 having an attached stud member according to an aspect of the present principles. The line strap 62/64 may comprise a generally "Z" shaped member having a connection pad 90 attached to a landing pad 96 via a link strap 98. The connection pad 90 is configured to connect to a line terminal 68/68' of a meter socket 30, and the landing pad 96 is configured for connecting to riser distribution buses 50/52/54.

A stud 91 may be provided having one end for inserting into a hole on the connection pad 90, and a second end for fitting into a slot on a line terminal 68/68' (shown in FIG. 3) of a meter socket 30. When the line strap 62/64 is installed in a modular metering device, the line strap 62/64 is fastened to a line terminal 68/68' via the stud 91 and a nut. When rephasing in the field is desired, the nut is loosened and removed and the stud 91 is disengaged from the slot of the line terminal 68/68'. This enables the line strap 62/64 to be completely removed, after which the line strap 62/64 may be connected from one riser distribution bus 50/52/54 to another.

According to one embodiment as shown in FIG. 4, cutoffs 97 around the connection pad 90 may be provided. That is, the connection pad 90 may be tapered and/or chamfered at its ends so as to be narrower in width than the width of the link strap 98 and landing pad 96.

The landing pad 96 includes a long slot 92 configured to slidably receive studs on desired riser feeder buses for achieving selective connection. Chamfers 95 may be included on the corners of the landing pad 96.

According to one embodiment, a length 401 of the landing pad 96 is greater than the length 403 of the connection pad 90. This enables long slot 92 to have sufficient depth and reach to connect with either center or side buses 50/52/54 as shown, e.g., in FIG. 5 and described further below. Furthermore, a surface area of contact between the landing pad 96 and a riser distribution bus 50/52/54 is advantageously maximized, due to the extended length of the landing pad 96, thus optimizing electrical surface area contact.

Figure 5:
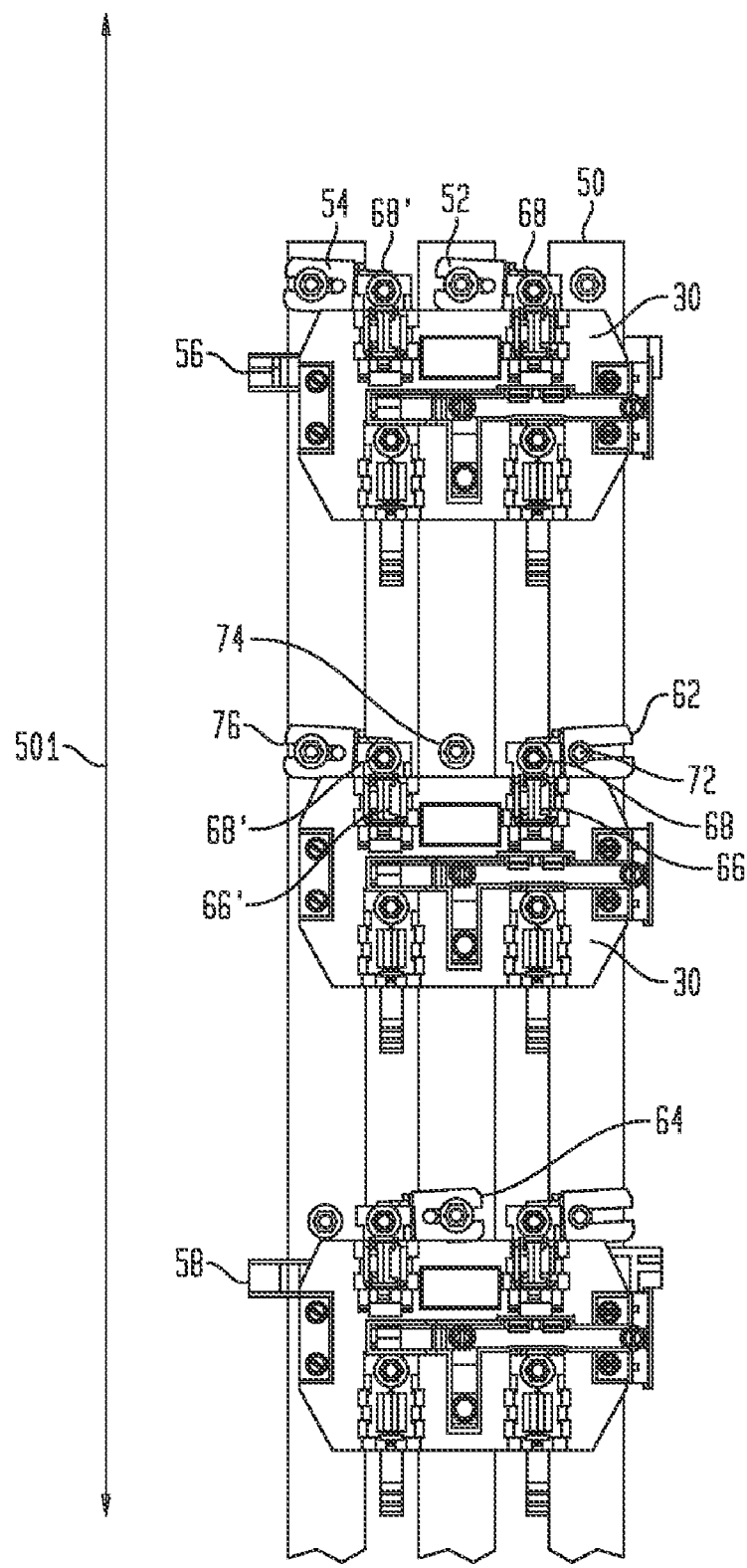
FIG. 5 is a front view showing exemplary rephasing mechanics of phase buses and meter sockets according to an aspect of the present principles.

FIG. 5 is a front view showing exemplary rephasing mechanics of phase buses 50/52/54 and meter sockets 30 according to an aspect of the present principles. The three riser distribution buses 50/52/54 are connected to different phases: A, E, and C, from the cross feeder buses 28, and are situated equidistant from each other. That is, the two side buses 50/54 are preferably equally spaced apart from the center bus 52. The riser distribution buses 50/52/54 may be framed together by insulating links 56/58 to precisely maintain the spacing between them as well as their spacing respect to the side wall of enclosure 10. Above the riser distribution buses 50/52/54, meter sockets 30 are positioned as previously shown in FIGS. 2 and 6. The two line terminals 68/68' of the line meter jaws 66/66' of a meter socket 30 are located above the riser distribution buses 50/52/54. Fastening means 72/74/76 (e.g., studs) are provided on the riser distribution buses 50/52/54 just above the line terminals 68/68' of each meter socket 30 and configured for receiving the line straps 62/64 and making the connection between the riser distribution buses 50/52/54 and a meter socket 30. When each line strap 62/64 is attached to a respective line terminal 68/68' of a meter socket 30, each long slot 92 (FIG. 4) is configured to be of sufficient length to reach and join a desired fastening means 72/74/76 on either side.

For example, as shown in FIG. 5, a line strap 62 can have a connection pad 90 secured to a line terminal 68, and have its landing pad 96 positioned on the right side and its slot 92 connected to the riser distribution bus 50 at the fastening means 72. Alternatively, the landing pad 96 can be positioned on the left side to connect to the center riser distribution bus 52 on the fastening means 74 with slot 92 now oriented on the left side. The top and bottom meter sockets show alternate connection configurations. Together, the exemplary connections of the three meter sockets 30 shown in FIG. 5 demonstrate A-B, B-C and A-C phase combinations.

According to one aspect of the present principles, when each line strap 62/64 is connected from one of the line terminals 68/68' to one of the distribution buses 50/52/54, a longitudinal axis 405 (shown in FIG. 4) of each line strap 62/64 is substantially perpendicular to the longitudinal axis 501 (shown in FIG. 5) of each bus 50/52/54.

The line straps 62/64 are preferably designed to be identical in configuration and dimension to avoid permitting both line straps 62/64 to be connected to the same riser distribution bus 50/52/54 from a single fastening means 72/74/76. This ensures that the two line straps 62/64 have to be connected to different riser distribution buses 50/52/54, which in turn ensures that the meter sockets 30 will deliver 240 VAC to the load tenant 34.

Figure 7:
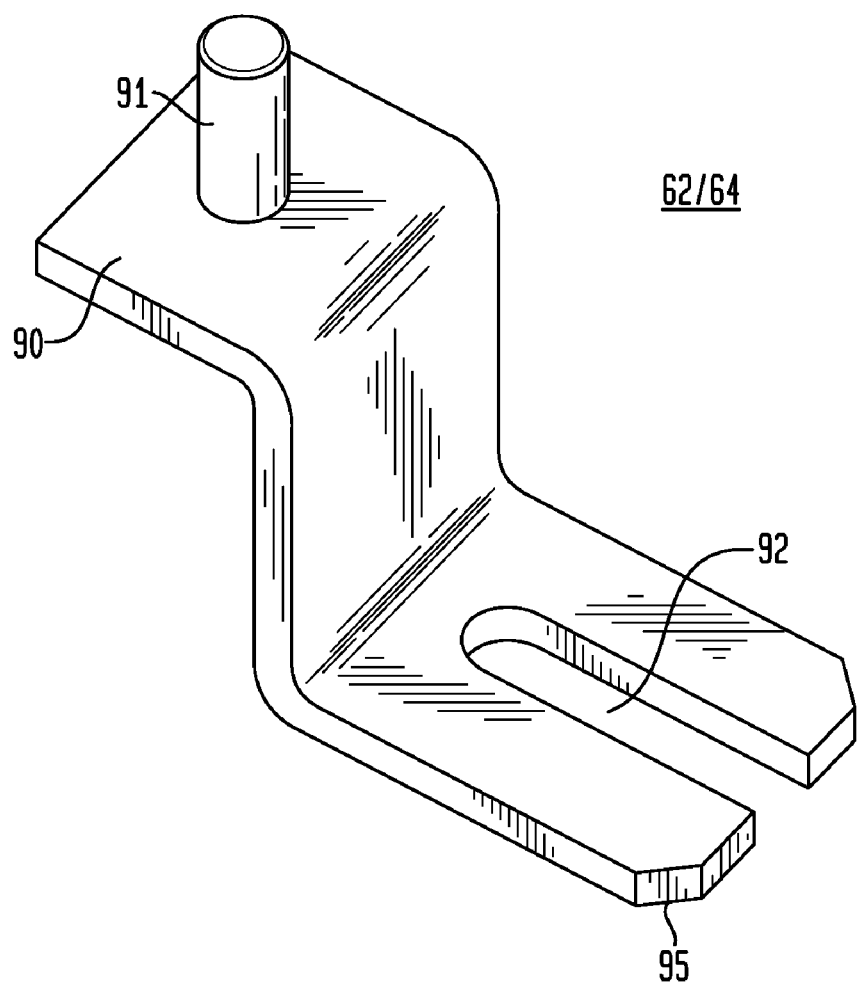
FIG. 7 is a front perspective view of an exemplary line strap according to an alternate embodiment according to the present principles.

FIG. 7 is a front perspective view of an exemplary line strap 62/64 according to an alternate embodiment according to the present principles. In this embodiment, the connection pad 90 is provided with no tapered sides (cutoffs) or chamfers.

Advantageously, a meter device according to the present principles enables selective connection of the two line straps 62/64 from the two line terminals 68/68' on a meter socket 30, to the at least three riser distribution buses 50/52/54. This provides A-B, B-C, and A-C rephasing to be easily and efficiently performed in the field. In addition, the surface area for electrical contact is maximized between the landing pad 96 and any one of the riser distribution buses 50/52/54 to which it is connected.

Having described preferred embodiments for a three phase group metering device with individually field rephaseable meter sockets (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A field rephaseable modular metering device including a meter section comprising:
    at least three vertical distribution buses comprising two side buses and a center bus each disposed equidistant from each other, the center bus having a vertical center line;
    at least one meter socket including a first line terminal and a second line terminal; and
    at least two line straps, each having a first end including an attached stud member configured for connecting with one of the first or second line terminals, and a second elongate end configured to be selectively connectable to one of the side buses associated with its line terminal or the center bus, wherein the second end is a landing pad, wherein when each line strap is positioned to connect one of the line terminals with one of the distribution buses, a longitudinal axis of each line strap is parallel with a length of at least the landing pad, where the length of the landing pad is measured from a landing pad end to a link strap, where the longitudinal axis of each line strap is perpendicular to a longitudinal axis of each distribution bus, and wherein the line straps are substantially identical in configuration such that only one line strap can be connected to a line terminal at a time.

2. The field rephaseable modular metering device of claim 1, further comprising:
    a barrier for separating the meter section from a breaker section of the modular metering device; and
    a breaker cover and a meter cover provided adjoining each other, wherein a junction of said breaker cover and said meter cover is provided in the meter section and wherein said barrier includes a rain channel disposed in the meter section for providing a rain-proof seal under the junction of the breaker cover and the meter cover.

3. The field rephaseable modular metering device of claim 2, wherein a vertical center line of each meter socket is offset from the vertical center line of said center bus.

4. The field rephaseable modular metering device of claim 3, wherein the offset comprises shifting the meter socket in a direction away from said rain channel.

5. The field rephaseable modular metering device of claim 1, wherein each line strap comprises a generally "Z" shaped member and the second elongate end including a long open slot.

6. The metering device of claim 1 wherein each line strap is connected to one of the first or second line terminals via the attached stud member being fitted through a slot on the respective line terminal, and fastened thereon with a nut.

7. The metering device of claim 5, wherein the second elongate end of each line strap includes at least two chamfered corners.

8. The metering device of claim 1, wherein a length of the second end of each line strap is greater than a length of the first end of each line strap.

9. The metering device of claim 1, wherein the selective connectability comprises connecting at least one of the line terminals to a desired one of a center bus and a side bus to achieve any one of an A-B, A-C or B-C phase combination.

10. The metering device of claim 1, wherein each of the distribution buses includes a protruding stud.

11. The metering device of claim 10, wherein the long open slot of the line strap is configured to slidably receive any one of the protruding studs of the distribution buses for achieving selective connection.

12. A field rephaseable modular metering device including a meter section comprising:
    at least three vertical distribution buses comprising two side buses and a center bus each disposed equidistant from each other, the center bus having a vertical center line;
    at least one meter socket having a vertical center line offset from the vertical center line of said center bus, each meter socket including a first line terminal and a second line terminal;
    at least two line straps, each having a first end configured for connecting with one of the first or second line terminals, and a second elongate end configured to be selectively connectable to one of the side buses associated with its line terminal or the center bus, wherein the second end is a landing pad, and wherein when each line strap is positioned to connect one of the line terminals with one of the distribution buses, a longitudinal axis of each line strap is parallel with a length of at least the landing pad, where the length of the landing pad is measured from a landing pad end to a link strap, where the longitudinal axis of each line strap is perpendicular to a longitudinal axis of each distribution bus; and
    a stud member attached to each line strap, wherein each line strap is connected to one of the first or second line terminals via the stud member wherein the line straps are substantially identical in configuration such that only one line strap can be connected to a line terminal at a time.

13. The field rephaseable modular metering device of claim 12, further comprising:
    a barrier for separating the meter section from a breaker section of the modular metering device; and
    a breaker cover and a meter cover provided adjoining each other, wherein a junction of said breaker cover and said meter cover is provided in the meter section and wherein said barrier includes a rain channel disposed in the meter section for providing a rain-proof seal under the junction of the breaker cover and the meter cover.

14. The metering device of claim 12, wherein each line strap comprises a generally "Z" shaped member and the second elongate end including a long open slot.

15. The metering device of claim 12, wherein the second end of each line strap includes at least two chamfered corners.

16. The metering device of claim 12, wherein a length of the second end of each line strap is greater than a length of the first end of each line strap.

17. A field rephaseable modular metering device including a meter section comprising:
  at least three vertical distribution buses comprising two side buses and a center bus each disposed equidistant from each other, the center bus having a vertical center line;
  at least one meter socket having a vertical center line offset from the vertical center line of said center bus, each meter socket including a first line terminal and a second line terminal; and
  at least two line straps, each having a first end including an attached stud member configured for connecting with one of the first or second line terminals, and a second elongate end configured to be selectively connectable to one of the side buses associated with its line terminal or the center bus, wherein the second end is a landing pad, wherein when each line strap is positioned to connect one of the line terminals with one of the distribution buses, a longitudinal axis of each line strap is parallel with a length of at least the landing pad, where the length of the landing pad is measured from a landing pad end to a link strap, where the longitudinal axis of each line strap is perpendicular to a longitudinal axis of each distribution bus, and wherein the line straps are substantially identical in configuration such that only one line strap can be connected to a line terminal at a time.

18. The field rephaseable modular metering device of claim 17, further comprising:
  a barrier for separating the meter section from a breaker section of the modular metering device; and
  a breaker cover and a meter cover provided adjoining each other, wherein a junction of said breaker cover and said meter cover is provided in the meter section and wherein said barrier includes a rain channel disposed in the meter section for providing a rain-proof seal under the junction of the breaker cover and the meter cover.

19. The field rephaseable modular metering device of claim 17, wherein a length of the second end of each line strap is greater than a length of the first end of each line strap.

* * * * *